Feb. 14, 1939.   H. P. BANGERT   2,146,707
AIR HOLDER FOR REFRIGERATORS
Filed Sept. 21, 1936   4 Sheets-Sheet 1

HARRY P. BANGERT,
INVENTOR.
By Donald E. Windle
and Robert W. Randle.
ATTORNEYS.

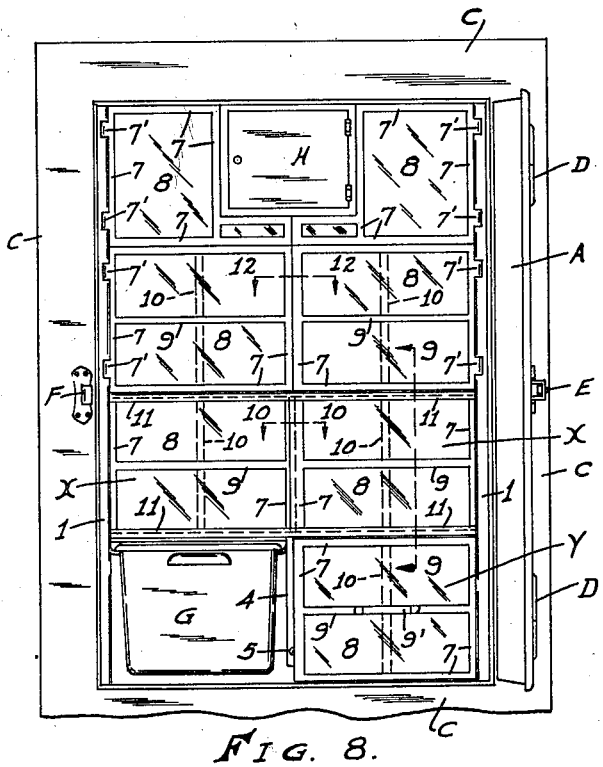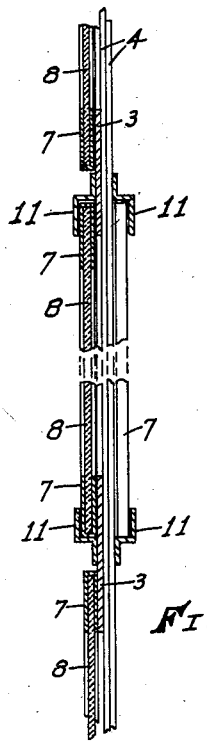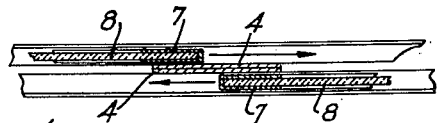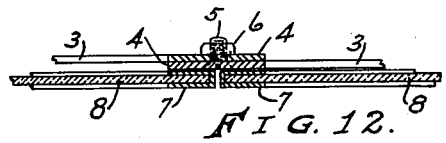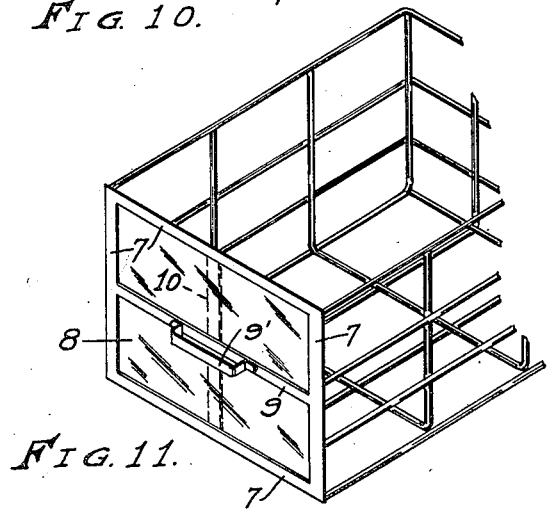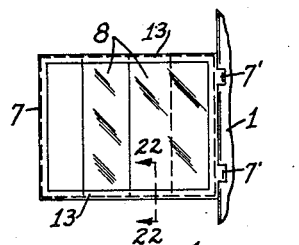

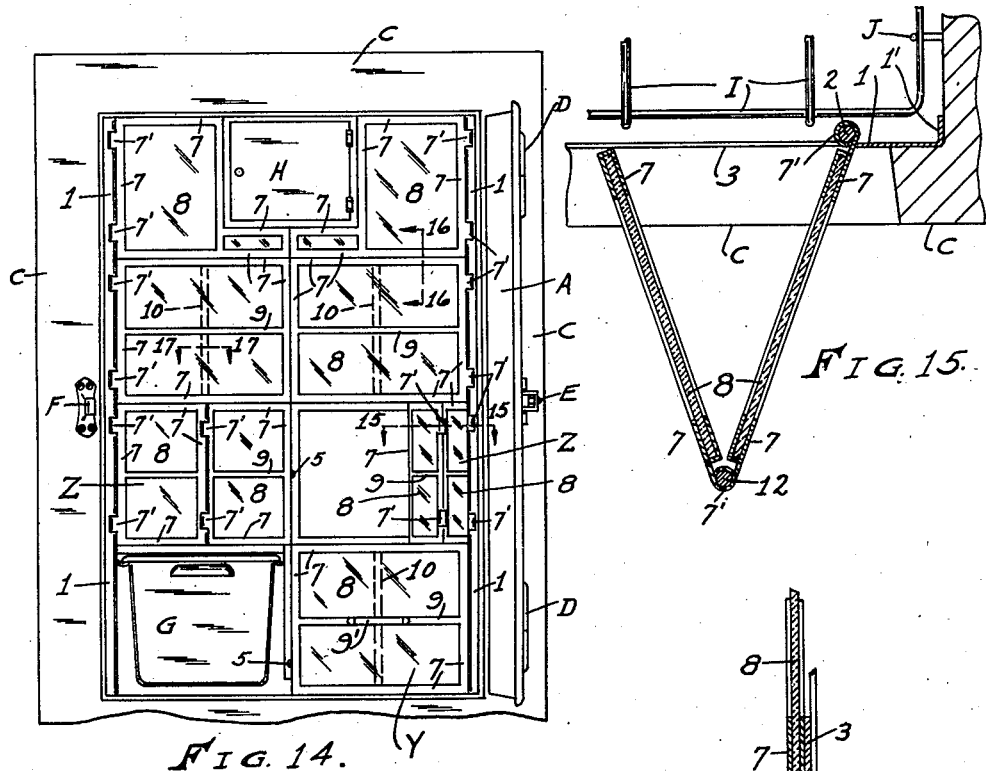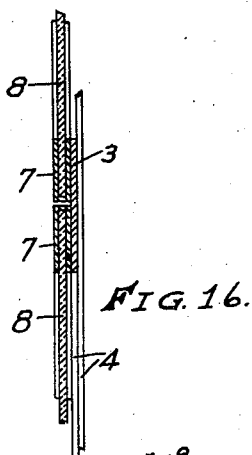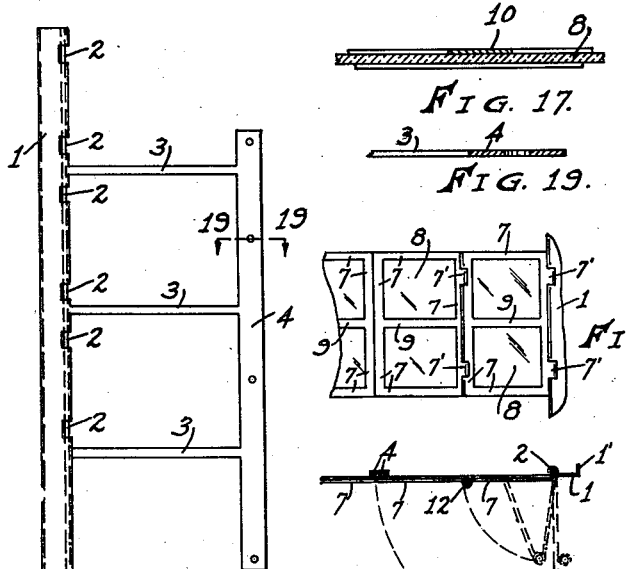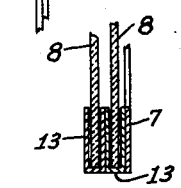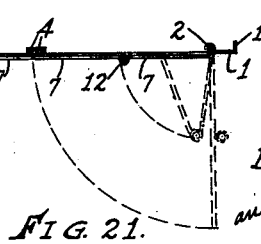

Feb. 14, 1939.　　　H. P. BANGERT　　　2,146,707
AIR HOLDER FOR REFRIGERATORS
Filed Sept. 21, 1936　　4 Sheets-Sheet 4

HARRY P. BANGERT,
INVENTOR.
By Donald E. Windle
and Robert W. Randle
ATTORNEYS.

Patented Feb. 14, 1939

2,146,707

UNITED STATES PATENT OFFICE 2,146,707

AIR HOLDER FOR REFRIGERATORS

Harry P. Bangert, Richmond, Ind.

Application September 21, 1936, Serial No. 101,809

3 Claims. (Cl. 312—189)

This invention relates to devices to be used in connection with refrigerating cabinets, and providing a means whereby the conventional large door thereto may be opened without permitting the chilled air contained within the cabinet to escape therefrom, and also to prevent outside air from entering the cabinet when the large door is opened.

The principal purpose of the invention is the provision of a means for retarding the flow of chilled air out of a refrigerating cabinet, and subsequently preventing the flow of outside air into the cabinet when the conventional outer door is opened, and thereby lessening the cost of the operation of the refrigerator and aiding in maintaining a more uniform temperature within the cooling chamber.

A further purpose of the invention is to lessen the cost of the operation of the refrigerator by providing a layer of air between the device and the outer door when the outer door is closed, and thereby providing additional insulation in the front portion of the cabinet and aiding in maintaining a more uniform temperature within the cooling chamber of the cabinet.

A further purpose of the invention is to lessen the number of times the operation of defrosting a mechanically operated refrigerator is necessary in a given length of time, this result being due to the fact that the subject device lessens the amount of air that flows out of and into the refrigerating chamber, and thereby lessening the amount of moisture condensed within the refrigerating chamber.

One manner of accomplishing the purposes of the invention is by the provision of a plurality of drawers or of comparatively small doors mounted within the front portion of the cabinet with each of the small doors or drawers being capable of being opened independently of the others, and thereby preventing an excess of change of air within the cabinet when entrance is made into the cabinet.

Another manner of accomplishing the purposes of the invention is the provision of a partition located within the cabinet and positioned in the forward portion thereof, with the partition containing a plurality of openings with a number of doors or drawers for closing the same and permitting separate access to separte portions of the shelves positioned within the cabinet.

Another manner of accomplishing the purposes of the invention is by the provision of a combination of one or more drawers and one or more doors mounted within the refrigerating cabinet, with each drawer and each door being capable of being opened independently of any other drawer or door located within the cabinet.

Still another manner of accomplishing the purposes of the invention is the provision of a unit which may be economically manufactured, which may be produced and distributed as an accessory, or may be made an integral part of a cabinet while the same is under construction.

Other purposes and advantages of the invention will suggest themselves in the course of the following description, and that which is new will be correlated in the appended claims.

The most satisfactory manner of carrying out the principles of the invention in a practical, economical, and efficient manner is shown in the accompanying four sheets of drawings, in which:

Figure 8 is a partial front elevation of a cabinet with a combination of hinged doors, sliding doors, and a sliding drawer.

Figure 9 is a detail vertical section through the sliding doors taken on line 9—9 of Figure 8.

Figure 10 is a detail cross section through a portion of the sliding doors, taken on line 10—10 of Figure 8.

Figure 11 is an isometric detail of the sliding drawer, with the same being shown equipped with my device.

Figure 12 is a detail cross section through the meeting edges of the swing doors, taken on line 12—12 of Figure 8.

Figure 13 is a partial elevation showing a swinging door frame having a pair of sliding panels in connection therewith.

Figure 14 is a partial front elevation of a cabinet and showing the same as being equipped with the combination of hinged doors, folding doors, and a sliding drawer, and with one of the folding doors being shown in partially opened position.

Figure 15 is a detail cross section through the partially opened folding door, taken on line 15—15 of Figure 14.

Figure 16 is a detail vertical section through the adjacent top and bottom edges of the hinged doors, taken on line 16—16 of Figure 14.

Figure 17 is a detail cross section taken on line 17—17 of Figure 14.

Figure 18 is a front elevation of one of the frame units.

Figure 19 is a detail cross section taken on line 19—19 of Figure 14.

Figure 20 is a partial elevation showing a hinged door frame having a pair of foldable panels in connection therewith.

Figure 21 is a detail plan view of the hinged door having the foldable panels in connection therewith, taken from line 21—21 of Figure 20.

Figure 22 is a detail vertical section taken on line 22—22 of Figure 13 and showing the relationship between the sliding panels and the swinging frame.

Like characters designate like parts throughout the several views.

Figure 1:
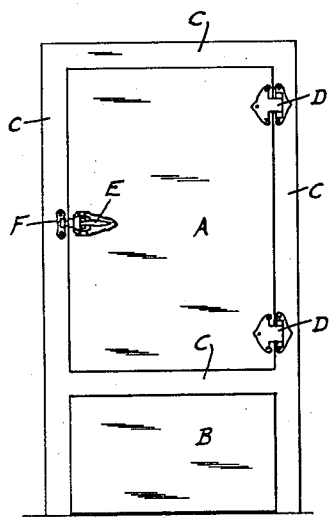
Figure 1 is a front elevation of a refrigerating cabinet, with the door thereof being shown in closed position.
Figure 7:
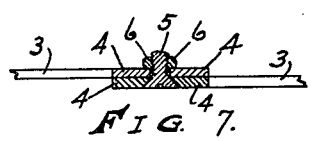
Figure 7 is a detail cross section through the meeting members of the frame, taken on line 7—7 of Figure 3.

In order that the construction, the utilization, and the advantages of the invention may be more fully understood and appreciated, I will now take up a detailed description thereof, in which the same will be set forth more fully.

In the drawings, A designates the conventional cabinet door, B designates the machine access door, and C designates the front faces of the cabinet which surround the door opening. The letters D designate the door hinges, E designates the latch, and F designates the latch keeper.

The crisper drawer or compartment is designated by G, and the door to the freezing unit is designated by H.

In the construction of my device, I have provided a frame comprised of left and right hand members, the same being preferably formed of metal although other materials may be used satisfactorily. I designates the vertical side members of the frame, the same having the outer edge portion I' thereof turned at right angles to the face portion I with the portion I' providing rigidity to the member I. Portions of the inner edges of the members I are notched with the inner edges I" being formed around the hinge rods 2 which extend the full height of the members I. The horizontally positioned members 3 are formed integrally with their respective members I and extend inwardly therefrom to the respective upright members 4 to which they are permanently secured. The members 4 are comparatively shorter than the members I in order to allow the frame to be placed into or out of a refrigerating cabinet. The members 4 are rigidly secured together by means of the threaded bolts 5 and the respective nuts 6. With the two frame units being thus assembled, they form a rigid frame to which doors may be hingedly secured. Also with the frame being formed in two sections, the same may be easily placed into position with relation to a cabinet, or may be easily removed therefrom for the purpose of cleaning the cabinet, etc.

Figure 2:
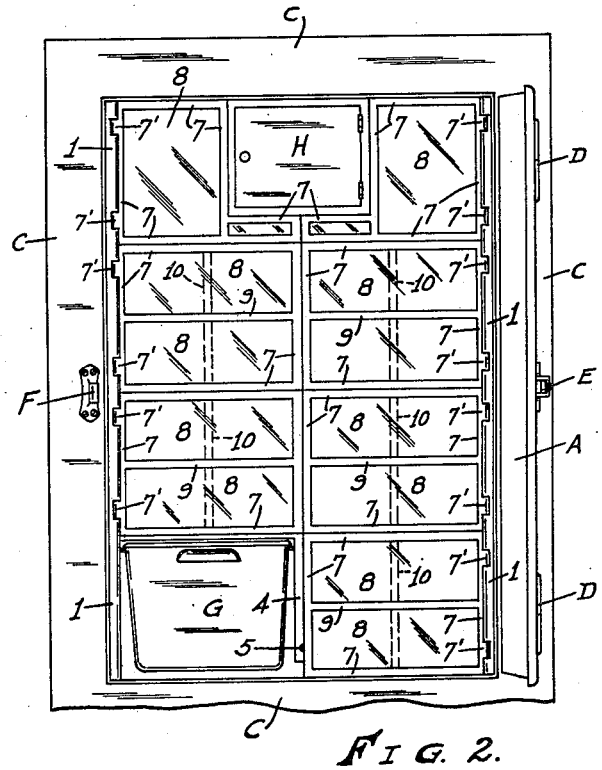
Figure 2 is a partial front elevation of the cabinet with the door thereof being shown in open position, and with the cabinet being equipped with the subject device, the same being shown as having a plurality of comparatively smaller hinged doors.
Figure 3:
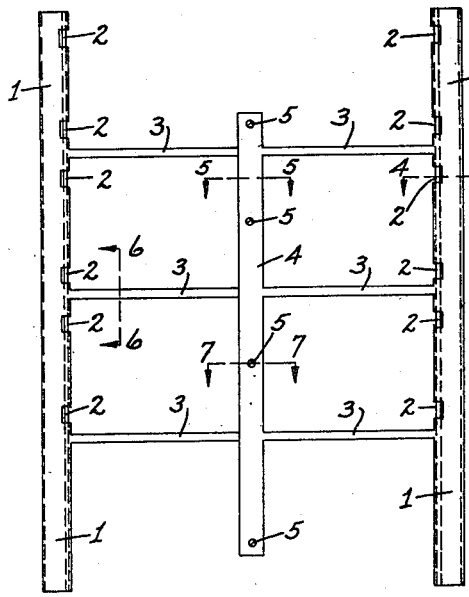
Figure 3 is a front elevation of the assembled frame to which the smaller doors are hingedly secured.
Figure 4:
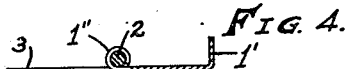
Figure 4 is a detail cross section taken on line 4—4 of Figure 3.
Figure 5:
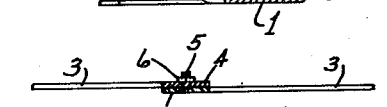
Figure 5 is a detail section taken on line 5—5 of Figure 3.
Figure 6:
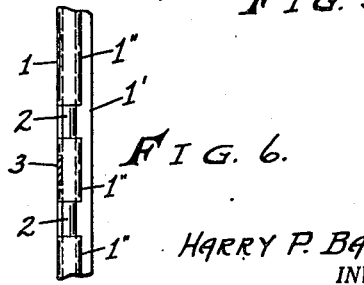
Figure 6 is a detail vertical section taken on line 6—6 of Figure 3.
Figure 23:
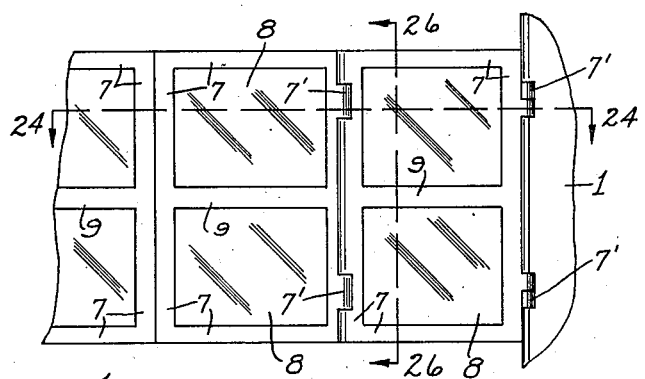
Figure 23 is a detail elevation similar to Figure 20, but on an enlarged scale.
Figure 26:
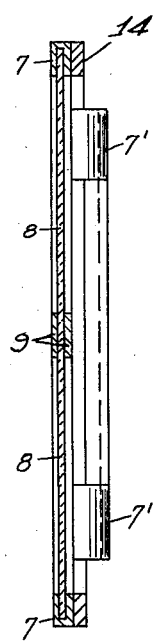
Figure 26 is a detail vertical section taken on line 26—26 of Figure 23.
Figure 24:
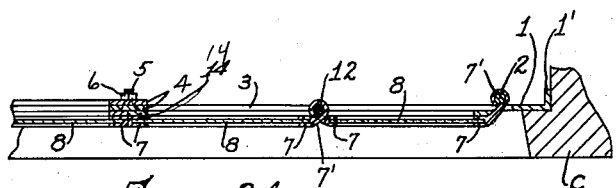
Figure 24 is a detail plan section taken on line 24—24 of Figure 23.
Figure 25:
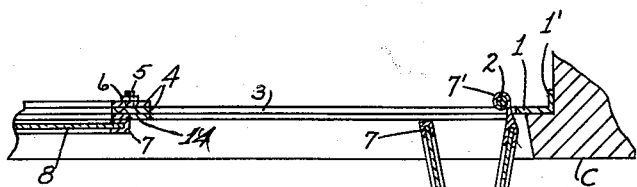
Figure 25 is a detail plan section similar to Figure 24, but showing the foldable panels in open position.
Figure 27:
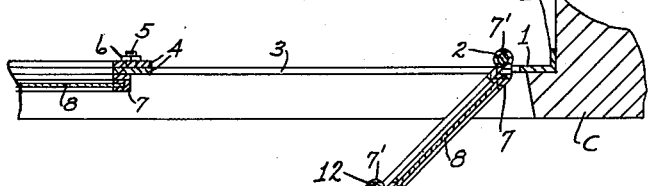
Figure 27 is a detail plan section showing the combined foldable panels and the swingable panel in open position.

Hinged doors are provided as shown in Figure 2, and are arranged with the upper and the lower edges thereof registering with the approximate horizontal centers of the members 3 of the frames. Each of the hinged doors is comprised of a frame 7 with the lugs 7' formed on one vertical edge thereof. The lugs 7' are formed around the respective hinge rods 2, and form a hinged joint therebetween. The frame 7 is formed in the shape of a channel into which the glass or similar transparent material 8 is secured. Each of the door frames 7 has a bar member 9 positioned horizontally between the two vertical members thereof, with the members 9 being rigidly secured at each of their ends to the respective vertical members. The vertically positioned bar members 10 are rigidly secured at their ends to the top and bottom members of the frames 7, and are preferably located on the opposite side of the glass panel 8 from the horizontally disposed bar members 9. The innermost vertical members of each of the door frames 7 extend approximately midway over the vertical frame members 4. By providing a plurality of small doors, as shown in Figure 2, any particular section of the interior of the cabinet is made accessible without the necessity of exposing the entire door opening to the outward flow of chilled air or the inward flow of outside air.

Figure 8 illustrates the combination of sliding doors (indicated by X), a slidable drawer (indicated by Y), and with hinged doors located above the sliding doors. The hinged doors being of the same construction as described supra. The sliding doors (indicated by X) are constructed similarly to the swinging doors except the lugs 7' are omitted. The sliding doors are adapted to slide in channels formed by the Z-shaped guide members 11, with the guide members 11 being rigidly secured to the respective members 3 of the frame, and form grooves or channels therebetween in which the sliding doors operate, as more clearly shown in Figure 9. One of the pair of sliding doors is adapted to slide forwardly of the vertical frame members 4 while the companion sliding door is adapted to slide rearwardly of the members 4, as indicated by the arrows in Figure 10.

The slidable drawer (indicated by Y) is comprised of a front portion which is similar in construction to that shown for the sliding doors, with a handle member 9' being rigidly secured to the front face of the bar member 9. The drawer proper is comprised of the usual wire construction, as shown in Figure 11.

Figure 14 illustrates the combination of a slidable drawer (indicated by Y), folding doors (indicated by Z), with swinging doors being located above the folding doors. The sliding drawer and the hinged doors are constructed as hereinbefore described. The folding doors (indicated by Z) are each comprised of a pair of hinged-together sections, the same being constructed in a manner similar to the above-described hinged doors, except that a hinged rod 12 is provided between the two sections of each of the folding doors. The central portion of each of the folding doors is adapted to swing forwardly from the cabinet, as shown in Figure 15.

Figure 15 also shows the relative position of the frame within the cabinet, with the usual wire racks or shelves I being positioned therein and supported by the usual supports J.

Figure 13 shows a single swinging door with sliding panels arranged in connection therewith. The swinging door, as shown in Figure 13, is comprised of the frame 7 having the lugs 7' formed around the hinge rod 2 as shown for other hinged doors in the drawings. The U-shaped guide members 13 are rigidly secured to the front faces of the top and bottom members of the frame 7, as shown in Figure 22. The sliding panels, as shown in Figure 13, are preferably made of glass or other rigid transparent material without a frame being formed therearound, although in some instances it may be desirable to provide a frame around the panels.

Figures 20, 23, 24, 25, 26, and 27 illustrate the combination of a pair of foldable panels mounted on a swinging door frame 14 with the foldable panels being adapted to open similarly to the panels shown in Figure 15.

It is possible to provide desirable combinations of swinging doors, sliding doors, foldable doors, and sliding drawers for the convenience of the user of the device, as partially illustrated in Figures 2, 8, and 14.

It is obvious that an entire unit may be comprised entirely of either swinging doors, sliding doors, foldable doors, or sliding drawers in lieu of the arrangements as shown on the drawings.

I desire that it be understood that minor changes may be made in the several details and in the arrangement of the parts herein shown and described, insofar as the changes may fall within the scope of the appended claims.

Having now fully shown and descibed the invention, what I claim, and desire to secure by Letters Patent of the United States, is:

1. In an air holder, a frame, a second frame hingedly secured to the first-mentioned frame, panels hingedly secured together with one edge of one panel being hingedly secured to the second frame, and with said panels being operable with or independently of the second frame.

2. In a refrigerating cabinet, an air holder comprising in combination, a frame comprising two oppositely disposed members removably positioned within and unattached to the cabinet, doors hingedly secured to a portion of said frame, channel guides formed on said frame, sliding doors operable in said channel guides, and means securing the oppositely disposed frame members together.

3. In a refrigerating cabinet, an air holder comprising in combination, a frame comprising two oppositely disposed members removably secured together within the cabinet and unattached thereto, hinge rods secured in said frame, a plurality of doors hingedly secured to said frame members by means of said hinge rods, guide members rigidly secured to portions of said frame members and forming channel guides between said guide members and the adjacent portions of said respective frame members, doors slidably positioned in the channel guides, and means for removably securing said frame members together within the refrigerating cabinet.

HARRY P. BANGERT.